(12) United States Patent
Kanning et al.

(10) Patent No.: US 10,989,682 B2
(45) Date of Patent: Apr. 27, 2021

(54) METHOD FOR CAPTURING A CONDITION OF A ROAD SURFACE

(71) Applicant: HELLA GmbH & Co. KGaA, Lippstadt (DE)

(72) Inventors: Bastian Kanning, Bremen (DE); Hauke Baumgaertel, Delmenhorst (DE); Anatoli Bystrow, Lilienthal (DE); Julien Bungalski, Bremen (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 69 days.

(21) Appl. No.: 16/186,220

(22) Filed: Nov. 9, 2018

(65) Prior Publication Data

US 2019/0145924 A1 May 16, 2019

(30) Foreign Application Priority Data

Nov. 10, 2017 (DE) .......................... 102017126411.6

(51) Int. Cl.
*G01N 27/22* (2006.01)
*B60T 7/12* (2006.01)
(Continued)

(52) U.S. Cl.
CPC .............. *G01N 27/228* (2013.01); *B60T 7/12* (2013.01); *B60T 8/17* (2013.01); *B60T 8/172* (2013.01);
(Continued)

(58) Field of Classification Search
None
See application file for complete search history.

(56) References Cited

U.S. PATENT DOCUMENTS

| | | | |
|---|---|---|---|
| 3,882,381 A | 5/1975 | Gregory | |
| 2008/0225395 A1* | 9/2008 | Veerasamy | ........... B60S 1/0825 359/601 |

(Continued)

FOREIGN PATENT DOCUMENTS

| | | |
|---|---|---|
| DE | 4029615 A1 | 4/1992 |
| DE | 4213221 A1 | 1/1993 |
| EP | 1602913 A1 | 12/2005 |

*Primary Examiner* — Jermele M Hollington
*Assistant Examiner* — Suresh K Rajaputra
(74) *Attorney, Agent, or Firm* — Muncy, Geissler, Olds & Lowe, P.C.

(57) ABSTRACT

In a method for capturing a condition of a surface of a road on which a vehicle is travelling, wherein at least one signal produced as a result of moisture thrown up from the road is captured by means of at least one sensor apparatus arranged on the vehicle, wherein the sensor apparatus includes at least one sensor device, and wherein the captured signal is evaluated by means of at least one evaluation device attached to the vehicle, it is provided as essential to the invention that at least one physical parameter of the thrown up moisture is captured by at least one sensor device, and that a conclusion is reached regarding the salt content of the moisture which reaches the sensor apparatus on the basis of at least one captured physical parameter, and a conclusion is reached regarding the condition of the road based on the salt content. The invention relates further to a sensor apparatus for a vehicle for capturing a condition of a surface of a road on which a vehicle is travelling having at least one sensor apparatus for detecting moisture thrown up by the vehicle tyres.

15 Claims, 1 Drawing Sheet

(51) Int. Cl.
*B60T 8/17* (2006.01)
*B60T 8/172* (2006.01)

(52) U.S. Cl.
CPC ........ *G01N 27/223* (2013.01); *B60T 2210/10* (2013.01)

(56) References Cited

U.S. PATENT DOCUMENTS

2017/0248552 A1* 8/2017 Niemann ............... G01N 29/14
2018/0065640 A1* 3/2018 Barthel ................ B60W 40/06
2018/0095034 A1* 4/2018 Stefan .................... G01N 29/14

* cited by examiner

METHOD FOR CAPTURING A CONDITION OF A ROAD SURFACE

BACKGROUND OF THE INVENTION

Field of the Invention

The invention relates to a method for capturing a condition of a surface of a road on which a vehicle is travelling, wherein at least one signal produced as a result of moisture thrown up from the road is captured by means of at least one sensor apparatus arranged on the vehicle, wherein the sensor apparatus includes at least one sensor device, and wherein the captured signal is evaluated by means of at least one evaluation device attached to the vehicle.

Description of Related Art

Methods for capturing a condition of a surface of a road on which a vehicle is travelling, particularly for detecting moisture or wet conditions on a road are well known, particularly in the automotive field. The capture of the condition of covering of a road with moisture is advantageous for example for issuing warnings to the vehicle operator, for example regarding hazards due to aquaplaning. The driving safety systems may also be preconditioned by the evaluation of the state of wetness of the road to enable the driving safety systems to be activated sooner.

In order to detect the moisture on a road, sound sensors may be used for example, particularly structure-borne sound sensors. In this context, structure-borne sound sensors in particular are arranged in the area of the vehicle wheels. The structure-borne sound sensors are able to capture sound signals that are generated when spray water that is thrown up from a wet road by the vehicle's wheels strikes the outer shell of the vehicle and are propagated inside the structure.

A method for capturing the degree of wetness of a road surface is known DE 4 213 221 C2, for example. In that method, the noise of spray water or the noise of rolling of at least one wheel of the motor vehicle is captured by means of a sensor arranged on the motor vehicle, and an output signal corresponding to the sound captured is generated. A frequency range which is characteristic of road wetness is isolated by bandpass filtering. A value assigned to a value for wetness of the road surface is generated to form the filtered output signal.

Hazardous road conditions may arise particularly when wetness is created for example by a melting process on a road covered with ice. The road can be extremely slippery, particularly due to moisture on top of a layer of ice, and it is essential to exercise extreme caution when driving the vehicle. In addition, these road conditions also place extra demands on the vehicle safety systems, such as the anti-lock braking system. It is usually difficult to detect a layer of ice below a film of moisture, so it is helpful if such road conditions are detected by the vehicle, in order to precondition the vehicle safety systems for example, or to output a warning message to the vehicle driver.

BRIEF SUMMARY OF THE INVENTION

The object underlying the invention is to suggest a method of the kind described in the introduction with which it is possible to detect moisture on the road, particularly moisture on the road that has been created by melted ice.

The solution to this object is realised with a method having the features of claim 1 and a device having the features of claim 11.

In a method for capturing a condition of a surface of a road on which a vehicle is travelling, wherein at least one signal generated as a result of moisture thrown up from the road is captured by means of at least one sensor apparatus arranged on the vehicle, wherein the sensor apparatus includes at least one sensor device, and wherein the captured signal is evaluated by means of at least one evaluation device attached to the vehicle, it is provided as essential to the invention that at least one physical parameter of the thrown up moisture is captured by at least one sensor device, and that a conclusion is reached regarding the salt content of the moisture which reaches the sensor apparatus on the basis of at least one captured physical parameter, and a conclusion is reached regarding the condition of the road based on the salt content.

A signal caused by the moisture on the road, a sound signal for example, is captured by means of a sensor apparatus, for example by means of a sound sensor. In particular, the sound signal may be a structure-borne sound signal which is captured by means of a structure-borne sound sensor arranged on the vehicle. The structure-borne sound signal may be caused for example by moisture which is thrown up by the wheels of a vehicle and strikes the outer shell of a vehicle. In order to detect the moisture, the sensor apparatus may be arranged in one or more of the vehicle's wheel arches. The captured structure-borne sound signal may be evaluated by means of an evaluation device, for example a computing unit or similar of the vehicle. In order to detect whether the moisture is caused by partial melting of a layer of ice on the road, at least one value of a physical parameter of the water striking the sensor is captured. For this purpose, besides a sensor device for capturing a sound signal the sensor apparatus may include a further sensor device for capturing a physical parameter of the water thrown up from the road. In order to demonstrate whether the moisture thrown up from the road is indeed moisture resulting from partial melting of an ice layer on the road, use is made of the fact that melted ice on an icy road is most often caused by the use of de-icing salt on the road surface. The use of de-icing salt brings about a change in the salt content of the water thrown up from the road, thereby influencing the physical properties of the water. For example, the electrical conductivity of water can change, in particularly it may increase, depending on its salt content. The salt content of water also has an effect on the electrical capacitance of the water. For example, by comparing the measured values of these physical parameters, for example the electrical conductivity or the electrical capacitance of the spray water striking the sensor with the corresponding values of the physical parameters of normal water, for example rainwater, a conclusion can be drawn about the salt content of the spray water. If it is found that the spray water thrown up from the road has an elevated salt content, it may be concluded that the spray water originates from water melted from an ice layer on the road. On this basis, a warning signal may be output to the vehicle operator. And driving safety systems such as the anti-lock braking system for example may also be preconditioned accordingly.

In a further development of the method, a conclusion is reached about moisture on the road originating from melted ice from the captured physical parameter. The salt content of the moisture thrown up from the road indicates the use of de-icing salt to clear an icy road. The salt content may be determined for example by determining a physical parameter of the thrown up water, such as the electrical conductivity of the water or the electrical capacitance of the water. An elevated salt content in the thrown up spray water may indicate that de-icing salt has been used, and thus suggest hazardous road conditions due to melting ice.

In a further development of the method, the physical parameter is the electrical conductivity of the moisture that reaches the sensor apparatus. By capturing the electrical conductivity of the water that reaches the sensor, it is possible to draw conclusions about the salt content of the water. The electrical conductivity of the water is dependent on the electrolyte content, particularly on the salt content in the water.

In a further development of the method, the physical parameter is the electrical capacitance of the moisture that reaches the sensor apparatus. The electrical capacitance of a volume of water is dependent on the electrolyte content, particularly on the salt content. A change in the electrical capacitance may provide an indication of a change in the salt content of the water. A difference between the determined electrical capacitance value in the thrown up spray water and the electrical capacitance value of a reference water sample, such as a sample of rainwater, enables a conclusion to be drawn regarding a salt content that differs from the reference sample.

In a further development of the method, the electrical conductivity and the electrical capacitance of the moisture reaching the sensor apparatus are captured. A more accurate determination of the salt content of the water is made possible by capture of the electrical capacitance and the electrical conductivity of the water that reaches the sensor.

In a further development of the method, a sound signal is captured by the sensor apparatus arranged on the vehicle. Moisture on the road may be detected with the aid of a sensor apparatus, particularly with the aid of a sound sensor when the spray water thrown up by a vehicle tyre is captured by the sound signal caused by the spray water striking a region of the outer shell of the vehicle. In particular, spray water may be projected forcefully against the wheel arch shells by a vehicle tyre, giving rise to sound signals, particularly structure-borne sound signals. It may be possible to render the method more accurate by capturing the moisture on the road with a sound sensor system.

In a further development of the invention, the captured sound signal is a structure-borne sound signal, the signal amplitude of the structure-borne sound signals is detected and from the signal amplitude of the structure-borne sound signal a conclusion is drawn about the quantity of water striking the sensor apparatus. Some of the wetness on the road is picked up by the vehicle's tyres and projected towards the wheel arch shells in the form of spray water. The spray water hitting the wheel arch shell creates mechanical pulses upon impact, which propagate in the wheel arch shell in the form of structure-borne sound signals and are converted into voltage signals by a structure-borne sound sensor, for example a piezoelectric structure-borne sound sensor. A conclusion can be drawn about the quantity of water striking the structure-borne sound sensor based on the amplitude of the structure-borne sound signal. The water quantity thus determined may be used for further evaluation.

In a further development of the method, the travel speed of the vehicle is determined, a dependency of the structure-borne sound signal amplitude from the travel speed is included in the evaluation of the structure-borne sound signal amplitude, and a conclusion is drawn about the quantity of water striking the sensor apparatus on the basis of the signal amplitude of the structure-borne sound signal. The structure-borne sound signal amplitude depends both on the quantity of the water striking the sensor and on the kinetic energy of the striking water. The kinetic energy of the water striking the sensor apparatus is dependent on the travelling speed of the vehicle, since at faster speeds the vehicle's tyres rotate faster and consequently the water thrown up by the tyres is accelerated more quickly, so it has more energy. Thus, a correlation exists between the structure-borne sound signal amplitude and the travel speed of the vehicle. With consideration of the travel speed of the vehicle, a correlation exists between the voltage signals output by the structure-borne sound sensor and the quantity of thrown up water. For example, a proportional relationship may exist between the voltage signals and the quantity of the thrown up water if the effect of the travel speed is subtracted out accordingly. Taking the travel speed into account enables the quantity of water thrown up to be determined accurately.

In a further development of the method, the dependency of the electrical capacitance of the water reaching the sensor apparatus on the travel speed of the vehicle is included in the evaluation of the electrical capacitance, and a conclusion is drawn about the quantity of water reaching the sensor apparatus from the electrical capacitance. The electrical capacitance of the water reaching the sensor apparatus measured by the sensor apparatus depends on the quantity, that is to say the volume of striking water. The quantity of the water that reaches the sensor apparatus depends on the travel speed of the vehicle. The faster the vehicle is travelling, the more water is thrown up from the road and the greater the volume of water striking the sensor apparatus. By considering the travel speed of the vehicle, a correlation is established between the quantity of water thrown up and the measured electrical capacitance. For example, the measured electrical capacitance may be proportional to the quantity of water that reaches the sensor apparatus if the effect of the travel speed is subtracted out accordingly. A precise determination of the quantity of water thrown up may be made based on the capacitance by taking the travel speed into account.

In a further development of the method, the quantity of water that reaches the sensor apparatus is determined by means of the structure-borne sound signal amplitude and by means of the electrical capacitance, and in the event of a difference between the water quantity determined from the structure-borne sound signal amplitude and the water quantity determined from the electrical capacitance, a conclusion is drawn about a change in the salt content of the water striking the sensor apparatus. For example, in the case of a road surface that is wet with normal rainwater having a normal salt content, there is a correlation between the quantity of water striking the sensor apparatus calculated from the structure-borne sound measurements and the capacitance measurements. This relationship no longer exists if the capacitance is altered by an elevated salt content in the thrown up spray water. For example, the conductivity and also the capacitance of the water thrown up may vary due to its salt content. The quantities of water that are determined by the voltage signals of the structure-borne sound sensor and from the measurement signals off the capacitance sensors no longer match when the water contains salt. If there is a difference between the water quantities calculated by the two sensor signals, it may be concluded that the quantity of water striking the capacitance sensor has an elevated salt content. For example, for standard water, that is to say water with a normal salt content for rain, a factor describing for example the relationship between the measured electrical capacitance and the quantity of water striking the sensor apparatus is calculated beforehand and stored in the evaluator, for example. The quantity of water calculated using this factor from the measured electrical capacitance is only correct for the standard water with normal salt content. A change in the salt content of the water results in an incorrect indicator of the water quantity, since the capacitance depends on both the water quantity and the salt content and thus the underlying factor is incorrect. The calculation of the water quantity by measuring the structure-borne sound signals generated by the thrown up water is not dependent on the salt content of the water. Thus, a difference between the water quantities that were determined by the two measurement methods would indicate that the salt content differs from that of the standard water.

A further aspect of the invention relates to a sensor apparatus for a vehicle for detecting a condition of a surface of a road on which the vehicle is travelling, which apparatus includes at least one sensor device for detecting moisture thrown up by the vehicle tyres, and having at least one evaluation device assigned to the sensor apparatus, in which it is essential for the purposes of the invention to provide that the sensor apparatus has at least one sensor device for capturing at least one physical parameter of the thrown up moisture. Sensor apparatuses for capturing moisture on a road on which a vehicle is travelling are known and are in use in many vehicles. In order to capture at least one physical parameter of the water striking the sensor apparatus, the sensor apparatus is equipped with at least one sensor device for capturing at least one physical parameter. In this case, the sensor device may particularly be a sensor device for capturing the electrical capacitance and/or for capturing the electrical conductivity of the water that strikes the sensor apparatus. Capturing one of these physical parameters makes it possible to determine a salt content of the thrown up waters or a change in the salt content of the thrown up water. Particularly hazardous road conditions may develop when an ice layer on the road melts partially, creating a layer of ice on the road which is covered with water. The melting or partial melting of an ice layer on the road is most often caused by the spreading of de-icing salt. This fact can be used to ascertain whether the water originates from melted ice by determining the salt content of the water striking the sensor, and/or the sensor apparatus may capture a higher salt content than is present in normal rainwater. In order to capture the salt content, a physical parameter such as the electrical conductivity and/or the electrical capacitance of the water may be determined, since these are dependent on the salt content of the water.

In a further development of the invention, at least one sensor device is an electrode pair for capturing the electrical capacitance of the thrown up moisture. For example, the sensor device for capturing a physical parameter of the water striking the sensor apparatus may be an electrode pair which is designed to capture electrical capacitance.

In a further development of the invention, at least one sensor device is an electrode pair for capturing the electrical conductivity of the thrown up moisture. For example, the sensor device for capturing a physical parameter of the water striking the sensor apparatus may be an electrode pair which is designed to capture electrical conductivity.

In a further development of the invention the sensor apparatus includes at least one sound sensor. In particular in this context, sound sensors, particularly structure-borne sound sensors may be used. For example, the structure-borne sound sensors may be arranged in the wheel arch shells close to the tyres, particularly behind the tyres when viewed from the front of the vehicle. Moisture from the road can by thrown up by the vehicle's tyres, in particular the water can be sprayed towards the rear of the vehicle in the direction opposite to the direction of travel, and strike the sensor apparatus arranged there. The quantity of spray water thrown up in this way gives rise to mechanical pulses and consequently vibrations in the wheel arches, and particularly on the sensor devices, which vibrations may be captured in the form of structure-borne sound signals. Thus, a wet condition of the road may be discerned by the sensor apparatus using the structure-borne sound signals generated by the thrown up water. The sensor devices for capturing structure-borne sound signals and the other sensor devices are preferably arranged such that the same quantity of water reaches the sensor devices.

In a further development of the invention, at least one sound sensor and at least one sensor device are arranged in a housing to capture a physical parameter. At least one sensor device for capturing structure-borne sound signals that are generated by the impact of water, that is to say a sound sensor, and at least one sensor device for capturing for example the electrical conductivity or the electrical capacitance of the water reaching the sensors are arranged in a shared housing. In this way, it is ensured that the measurements by the sensor device for capturing electrical conductivity or electrical capacitance and those of the sound sensor or structure-borne sound sensor are comparable. In addition, it is possible to use the same transmission paths, wires for example, may be used to transmit the signals to an evaluator for evaluating the captured signals. In particular, two electrode pairs and a piezoelectrical element for capturing the structure-borne sound signals may be arranged in one housing, wherein one electrode pair is provided to capture electrical capacitance and one is provided to capture electrical conductivity.

In a further development of the invention, at least one sound sensor and at least one sensor device are arranged on a common circuit carrier. A circuit carrier may be for example a printed circuit board, a conductor board, or even a flexible substrate on which the circuits may be arranged. In particular, the sensors may be applied with a printing process. Use of a common circuit carrier makes installation of the sensor apparatus particularly simple. The modular construction may also make it possible to retrofit a motor vehicle with corresponding sensor apparatuses subsequently.

BRIEF DESCRIPTION OF THE DRAWINGS

In the following section, the invention will be explained further with reference to a preferred embodiment thereof as shown in the drawing. In detail, the schematic representations show.

DETAILED DESCRIPTION

Figure 1:
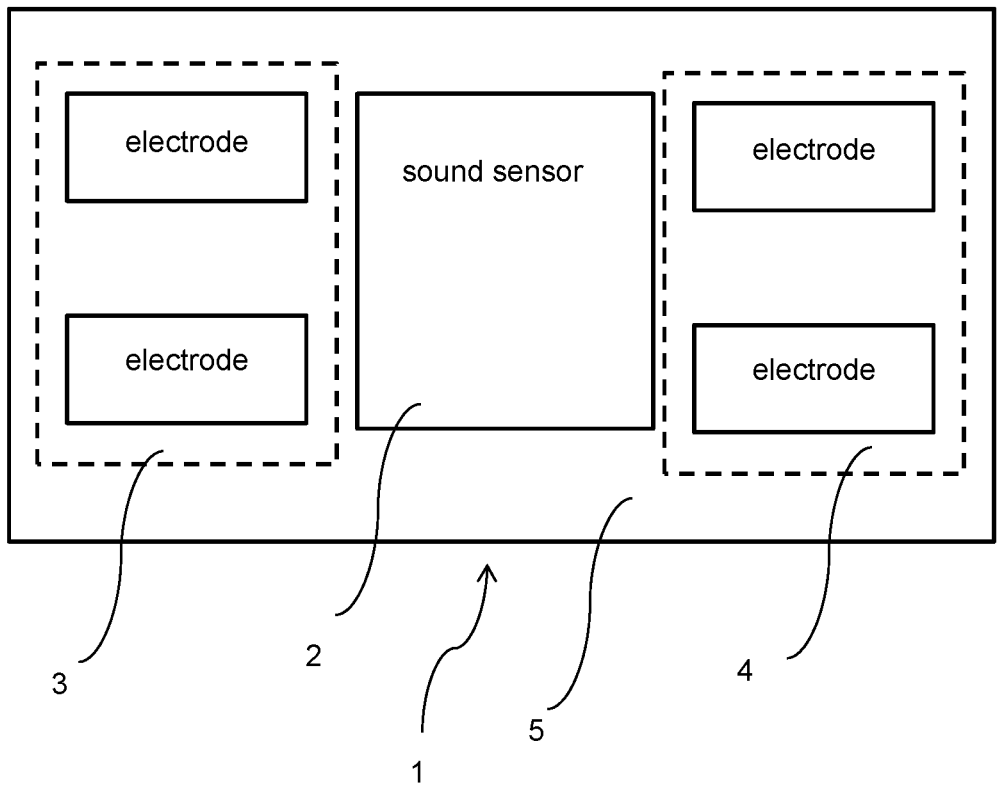
FIG. 1: a schematic layout of a sensor apparatus according to the invention with sound sensor and sensor devices for capturing physical parameters.

FIG. 1 represents a sensor apparatus 1 with a sound sensor 2 and electrode pairs 3, 4 designed to function a sensor devices. Sound sensor 2 may be in the form of a piezoelectrical element for example. Electrode pair 3 may be designed to capture electrical capacitance, for example, while electrode pair 4 is designed to capture electrical conductivity. Sound sensor 2 and electrode pairs 3, 4 are arranged on a common circuit carrier 5.

Figure 2:
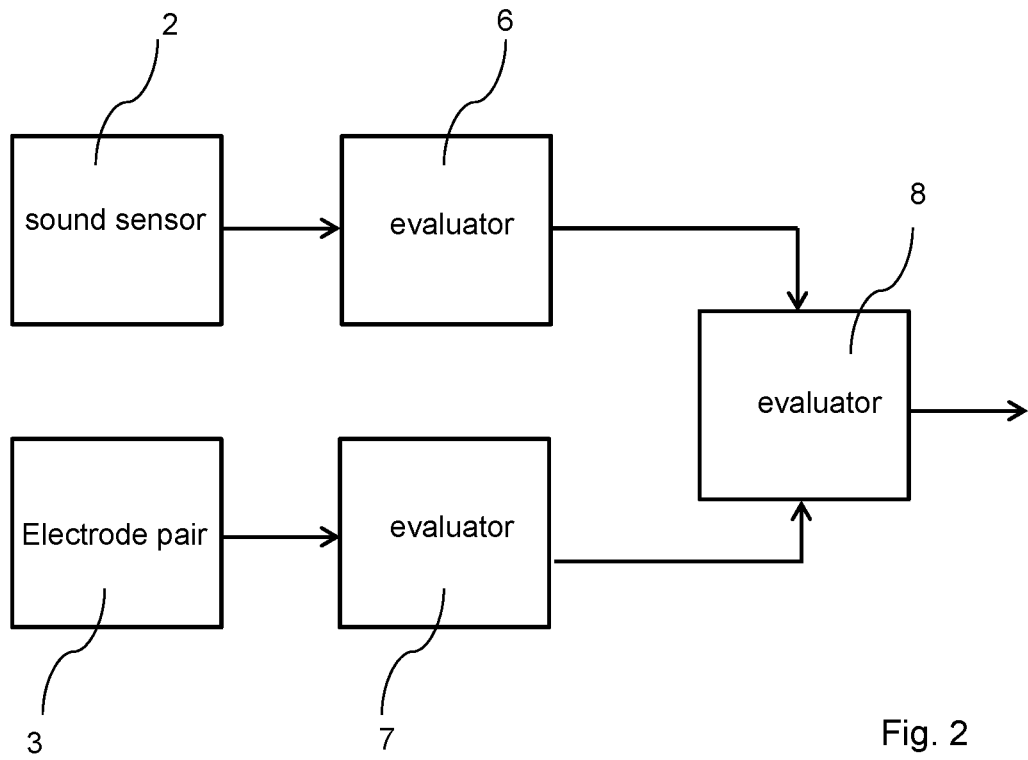
FIG. 2: a schematic illustration of the signal flow.

FIG. 2 illustrates the signal flow for a possible measurement. The structure-borne sound signal detected by a piezoelectric sound sensor 2 may be evaluated by evaluator 6. The signals relating to a physical parameter of the water, for example a capacitance signal, may be captured by an electrode pair 3 and evaluated by an evaluator 7. The structure-borne sound signals and the capacitance signals may be merged and evaluated in an evaluator 8 to ascertain the salt content of the water.

All of the features identified in the preceding description and in the claims can be combined in any permutation with the features of the independent claim. The disclosure of the invention is thus not limited to the feature combinations described and claimed, but rather all feature combinations that are reasonable within the scope of the invention are to be considered disclosed.

The invention claimed is:

1. A method for capturing a condition of a surface of a road on which a vehicle is travelling, wherein at least one signal generated as a result of moisture thrown up from the road is captured by means of at least one sensor apparatus arranged on the vehicle, wherein the sensor apparatus includes at least one sensor device, and wherein the captured signal is evaluated by means of at least one evaluation device attached to the vehicle,
   wherein at least one physical parameter of the thrown up moisture is captured with at least one sensor device;
   wherein a conclusion is reached regarding the salt content of the moisture which reaches the sensor apparatus on the basis of at least one captured physical parameter, and a conclusion is reached regarding the condition of the road based on the salt content; and
   wherein the physical parameter is the electrical capacitance of the moisture which reaches the sensor apparatus;
   wherein the quantity of water striking the sensor apparatus is determined by means of the structure-borne sound signal amplitude and by means of the electrical capacitance, in the event of a difference between the water quantity determined from the structure-borne sound signal amplitude and the water quantity determined from the electrical capacitance a conclusion is drawn regarding a change of the salt content in the water striking the sensor apparatus;
   wherein a factor describing the relationship between the measured electrical capacitance and the quantity of water striking the sensor apparatus is calculated in advance for water with a normal salt content, and a change in the salt content of the water, for which the factor is incorrect, results in an incorrect indicator of the water quantity.

2. The method according to claim 1, wherein a conclusion is reached regarding moisture originating from melted ice on the road based on the captured physical parameter.

3. The method according to claim 1, wherein the physical parameter is the electrical conductivity of the moisture which reaches the sensor apparatus.

4. The method according to claim 1, wherein the electrical conductivity and the electrical capacitance of the moisture reaching the sensor apparatus is captured.

5. The method according to claim 1, wherein a sound signal is captured by the sensor apparatus arranged on the vehicle.

6. The method according to claim 5, wherein the sound signal is a structure-borne sound signal, the signal amplitude of the structure-borne sound signal is captured, and a conclusion is reached regarding the quantity of water striking the sensor apparatus on the basis of the signal amplitude of the structure-borne sound signal.

7. The method according to claim 6, wherein the travel speed of the vehicle is determined, a dependency of the structure-borne sound signal amplitude on the travel speed is included in the evaluation of the structure-borne sound signal amplitude, and a conclusion is reached regarding the quantity of water striking the sensor apparatus on the basis of the signal amplitude of the structure-borne sound signal.

8. The method according to claim 1, wherein the dependency of the electrical capacitance of the water striking the sensor apparatus on the travel speed of the vehicle is included in the evaluation of the electrical capacitance, and a conclusion is reached regarding the quantity of water striking the sensor apparatus on the basis of the electrical capacitance.

9. A sensor apparatus for a vehicle for detecting moisture originating from melted ice on a road on which the vehicle is travelling, having at least one sensor device for capturing moisture thrown up by the vehicle tyres, and having at least one evaluator assigned to the sensor device,
   wherein the sensor apparatus includes at least one sensor device for capturing at least one physical parameter of the moisture thrown up;
   wherein a conclusion is reached regarding the salt content of the moisture which reaches the sensor apparatus on the basis of at least one captured physical parameter, and a conclusion is reached regarding the condition of the road based on the salt content; and
   wherein the physical parameter is the electrical capacitance of the moisture which reaches the sensor apparatus;
   wherein the quantity of water striking the sensor apparatus is determined by means of the structure-borne sound signal amplitude and by means of the electrical capacitance, in the event of a difference between the water quantity determined from the structure-borne sound signal amplitude and the water quantity determined from the electrical capacitance a conclusion is drawn regarding a change of the salt content in the water striking the sensor apparatus;
   wherein a factor describing the relationship between the measured electrical capacitance and the quantity of water striking the sensor apparatus is calculated in advance for water with a normal salt content, and a change in the salt content of the water, for which the factor is incorrect, results in an incorrect indicator of the water quantity.

10. The sensor apparatus according to claim 9, wherein at least one sensor device is an electrode pair for capturing the electrical capacitance of the thrown up moisture.

11. The sensor apparatus according to claim 9, wherein at least one sensor device is an electrode pair for capturing the electrical conductivity of the thrown up moisture.

12. The sensor apparatus according to claim 9, wherein the sensor apparatus includes at least one sound sensor.

13. The sensor apparatus according to claim 9, wherein at least one sound sensor and at least one sensor device are arranged in a shared housing to capture at least one physical parameter.

14. The sensor apparatus according to claim 9, wherein at least one sound sensor and at least one sensor device are arranged on a common circuit carrier.

15. A method for capturing a condition of a surface of a road on which a vehicle is travelling, wherein at least one signal generated as a result of moisture thrown up from the road is captured by means of at least one sensor apparatus arranged on the vehicle, wherein the sensor apparatus includes at least one sensor device, and wherein the captured signal is evaluated by means of at least one evaluation device attached to the vehicle,
- wherein at least one physical parameter of the thrown up moisture is captured with at least one sensor device;
- wherein a conclusion is reached regarding the salt content of the moisture which reaches the sensor apparatus on the basis of at least one captured physical parameter, and a conclusion is reached regarding the condition of the road based on the salt content; and
- wherein the quantity of water striking the sensor apparatus is determined by means of the structure-borne sound signal amplitude and by means of the electrical capacitance, in the event of a difference between the water quantity determined from the structure-borne sound signal amplitude and the water quantity determined from the electrical capacitance a conclusion is drawn regarding a change of the salt content in the water striking the sensor apparatus;
- wherein a factor describing the relationship between the measured electrical capacitance and the quantity of water striking the sensor apparatus is calculated in advance for water with a normal salt content, and a change in the salt content of the water, for which the factor is incorrect, results in an incorrect indicator of the water quantity.

* * * * *